F. W. WOOD.
INDICATING MECHANISM.
APPLICATION FILED JAN. 4, 1919.

1,400,199.

Patented Dec. 13, 1921.
2 SHEETS—SHEET 1.

INVENTOR
Frank W. Wood
BY HIS ATTORNEYS

F. W. WOOD.
INDICATING MECHANISM.
APPLICATION FILED JAN. 4, 1919.
1,400,199.
Patented Dec. 13, 1921.
2 SHEETS—SHEET 2.
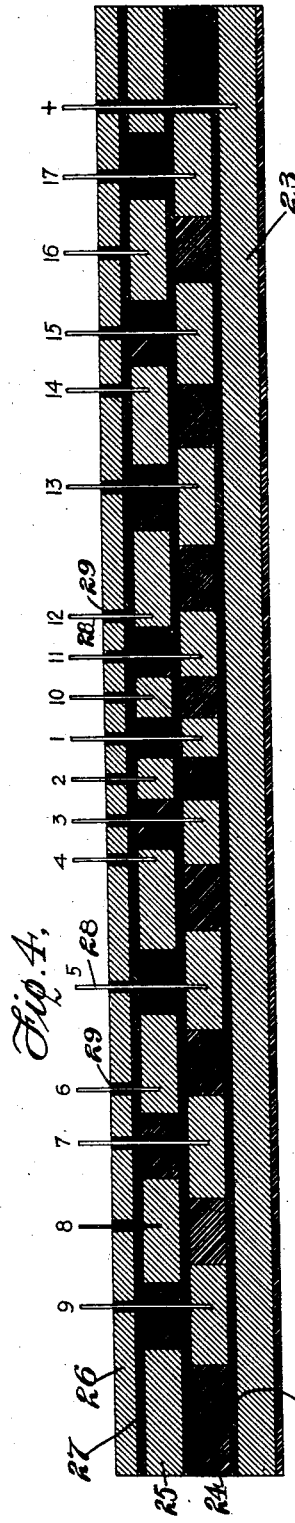
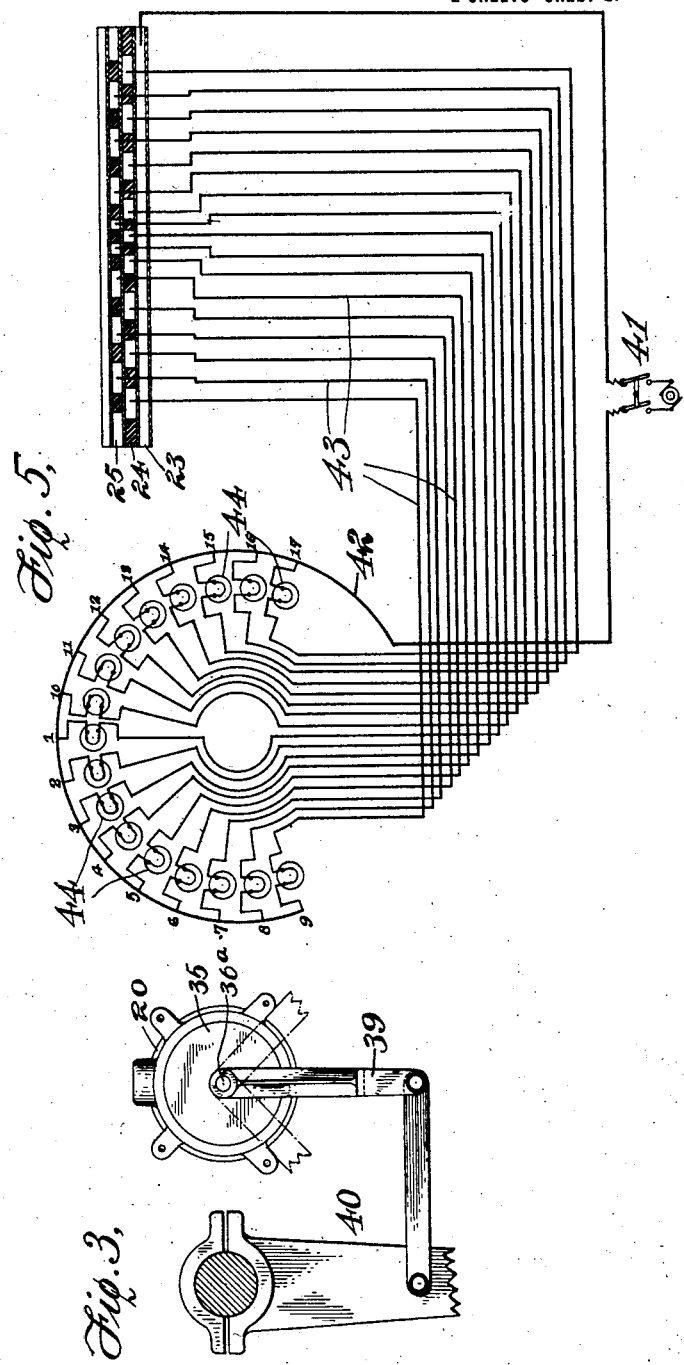
INVENTOR
*Frank W. Wood*
BY HIS ATTORNEYS

UNITED STATES PATENT OFFICE.

FRANK W. WOOD, OF MONTCLAIR, NEW JERSEY, ASSIGNOR TO CHARLES CORY & SON, INCORPORATED, OF NEW YORK, N. Y., A CORPORATION OF NEW YORK.

INDICATING MECHANISM.

1,400,199.  Specification of Letters Patent.  Patented Dec. 13, 1921.

Application filed January 4, 1919. Serial No. 269,683.

*To all whom it may concern:*

Be it known that I, FRANK W. WOOD, a citizen of the United States, residing at Montclair, in the county of Essex and State of New Jersey, have invented new and useful Improvements in Indicating Mechanism, of which the following is a specification.

This invention relates to indicating mechanism, pertaining more particularly to means for automatically indicating the direction and extent of swinging or oscillating of structures; in other words, the invention is of the type to automatically indicate the positions of structures of this type at all times.

While the invention may be employed in various connections, it is particularly adapted for use in indicating the positions of rudders, and this particular use will be employed in illustrating and describing the invention, such use being of the type disclosed in my prior invention disclosed in U. S. Patent No. 914,626, March 9, 1909, the present invention pertaining more particularly to the transmitter unit of the general combination disclosed in said patent. In the present disclosure the number of individual indicating elements employed is seventeen, an increase of two over the number employed in said patent.

The present invention is designed to meet various problems arising in connection with providing the indications with accuracy under the difficulties of installation and electrical operation, the ease and certainty of operation, the wear-resisting qualities, and general simplicity and compactness. In addition, the invention provides for greater increase in number of indicating points without corresponding increase in number of circuits.

To these and other ends, therefore, the nature of which will be readily understood as the invention is hereinafter disclosed, said invention consists in the improved constructions and combinations of parts hereinafter fully described, illustrated in the accompanying drawings, and more particularly pointed out in the appended claims.

In the accompanying drawings, in which similar reference characters indicate similar parts in each of the views,—

Fig. 3 is a fragmentary view indicating a simple way of connecting the transmitter to the rudder structure.

Fig. 4 is a plane diagrammatic view illustrating the general arrangement of the circuit make and break stationary contacts, and Fig. 5 is a diagrammatic view illustrating a simple form of wiring connections between the transmitter and an indicator.

Figure 1:
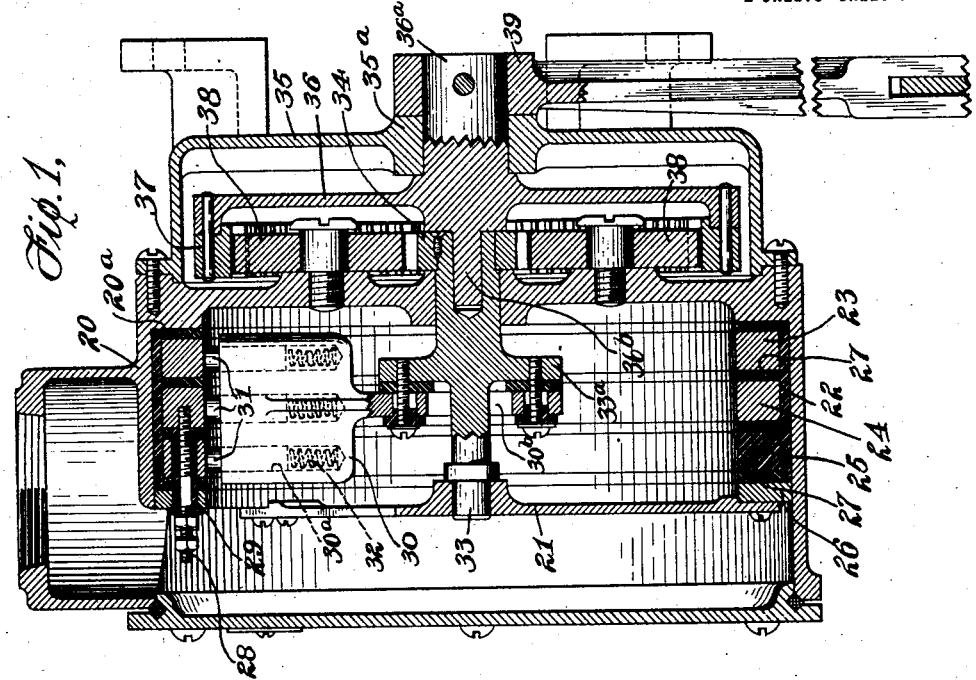
Figure 1 is a view partly in section and partly in elevation, showing one form of transmitter which may be employed in carrying out the present invention.

Rudder movements are generally limited to a range of 90 deg.—45 degrees on opposite sides of the fore and aft line of the vessel—and this range is rarely utilized; in fact, the service range is practically under 80 deg., and approximately this range is that generally employed as the maximum indicating range of rudder movement. This fact forms the basis of the present practice of translating this range of movement into a range approaching the degree length of a circle, this being generally provided by a gear-ratio connection of "four-to-one," so that the angular degree limit of 80 deg. in the rudder structure is translated into a range of approximately 320 deg. in the translating transmitter.

This ratio may obviously be varied as may be desired to accommodate for other range limits—as when the invention is employed in other uses—but for purposes of illustration, this ratio is employed, being advantageous in connection with electrical operations, enabling a proper insulating effect to be provided.

This problem of insulation is of especial importance where the indicating mechanism is of a type employing no moving parts—as where a plurality of lamps indicate definite positions of the rudder, a simple form of electrical indicator. Each lamp is located in an independent circuit and hence the transmitter must be arranged to make and break these circuits and yet present the production of "blind" spots in the rudder travel. This problem has been generally solved in the disclosure of the prior patent by employing a rotatable contactor or make and break element in coöperation with properly positioned segments, these segments being arranged in two parallel series, one series being staggered relative to the other, permitting adjacent segments to be properly insulated while providing indications throughout the range limits of the rudder. In the patented disclosure the indications are fifteen in number—seven on opposite sides of the fore and aft line, these representing the maximum number of position indications provided, thus requiring the use of a corresponding number of lamp circuits. In order to reduce the circuits as far as possible, advantage is taken of the fact that the rudder movements are generally within a small range, the increased range being provided only occasionally; this fact is utilized by extending the range zone of the infrequent circuits, the zones of those of frequent use being relatively short.

In the present invention the number of circuits is increased by two, thus correspondingly increasing the number of lamps employed. In addition, however, the contact structure is formed to produce a plurality of additional position-signals by producing distinct signals formed of pairs of lamps, each pair representing an angular distance of predetermined amount, represented by the length of overlaps of the active segments. This permits reduction in range zones of the segments and provides additional signals as well as greater uniformity in angular distance zones. For instance, the arrangement of the present invention not only provides the two additional individual indications, but the overlapping adds thereto thirteen small zone indications presented by the two-lamp signals. In other words, instead of the fifteen position signals of the patent structure, the present invention provides for thirty signals by the addition of the two circuits.

The specific arrangement will be presently described.

Figure 2:
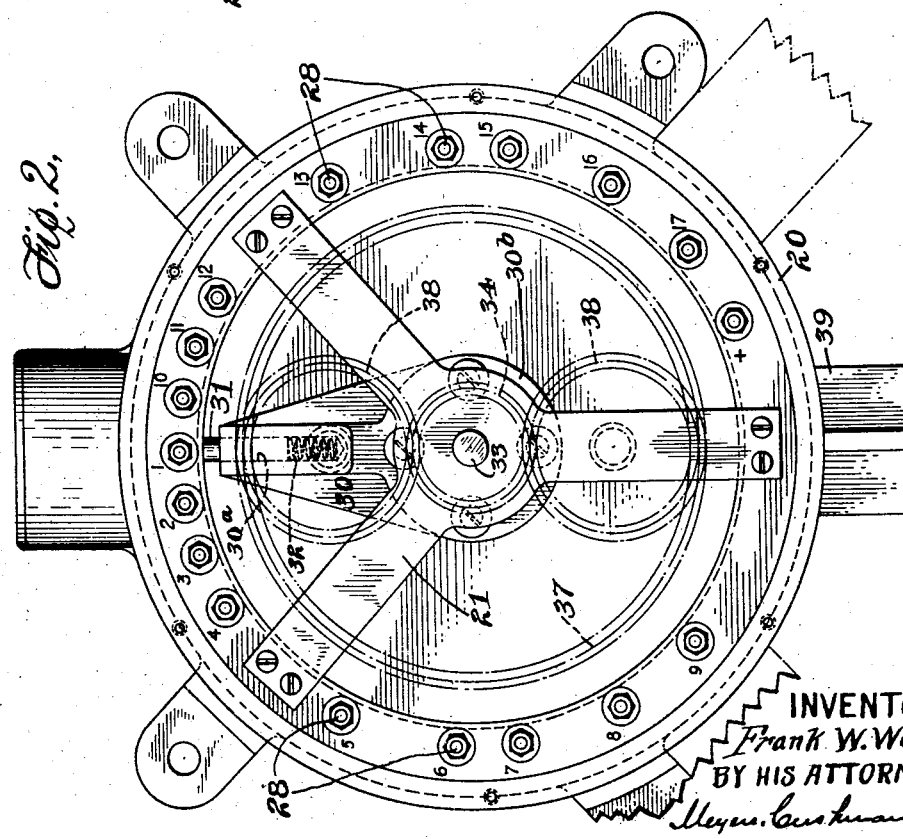
Fig. 2 is a face view of the same with the face plate removed, parts being broken away.

Referring to Figs. 1 and 2, 20 indicates the main casing having an open face normally closed by a removable plate 21. Formed at a suitable point on the periphery is a suitable tubular extension open to the interior of the casing and which forms a passageway for the various electrical leads extending into the casing chamber.

The internal periphery of the casing is circular and, together with an annular seat 20ª, serves to position a composite or built-up stationary contact structure shown in section in Fig. 1 and more or less diagrammatically in Fig. 4. This structure comprises a tubular insulating member 22 fitting the peripheral face, an annular continuous contact 23, annular contacts 24 and 25 of segment formation, clamp ring 26, and annular insulating members 27 separating the several contacts and the clamp ring.

Contacts 24 and 25 have their segment arrangement substantially as shown in Fig. 4, being built up generally of metallic and insulating segments in alternation, the insulating segments being shown in section. On the contrary, contact 23 is shown as a metallic ring.

The various terminal studs are indicated at 28, these having their inner ends secured to the proper contact portions, with the outer ends projecting beyond ring 26 and carrying clamping nuts for maintaining the structure and for lead connection. Each stud is insulated from the parts through which it passes by an insulating bushing 29.

A diagrammatic view of the composite contact structure is presented in Fig. 4, in which the studs are shown in their approximate locations, the numerals shown being similar to those shown in Fig. 2 and of the lamp numbers in Fig. 5, these views indicating the general arrangement by which the positions of the contacts are made effective to indicate rudder positions.

By reference to Fig. 4 it will be seen that contact 23 has but a single stud which connects one side of the main circuit to the system, as shown in Fig. 5. Contacts 24 and 25, however, are built up from segments—metallic and insulating—each active metallic segment carrying its individual stud. As shown, the metallic segments of one contact are in substantial alinement with the insulating segments of the other contact. This alinement is accurate in the three positions indicated as 1, 2 and 10, the remaining metallic segments, however, having an overlapping arrangement, as indicated, for instance, in the positions 3, 4 and 5, the structure being preferably arranged in such manner that the length of overlap is substantially equal; for instance, in the particular embodiment shown, the overlap of segments for positions 3 and 4 is an angular distance of four degrees representing the angular distance of one degree in the rudder movement. In operation, the movement of the contactor, presently described, would complete the circuit through lamp 3 as long as it contacts the correspondingly numbered segment. Before passing out of contact with this segment 3 it also passes into contact with segment 4 during movement to the left in Fig. 4 and completes the circuit for lamp 4, both lamps being made active during the travel of the overlapping distance, lamp 3 becoming inactive when the contactor breaks circuit with segment 3, leaving lamp 4 as the active lamp. Hence, the concurrent activity of the two circuits will, in itself, provide an indicating signal of a distinctive type, not only as to visibility, but also in that it can be confined to a comparatively short and definite angular distance without liability of arcing. And by producing these distinctive signals at desired points, the observer of the indicator can more readily and accurately determine the reading and govern his succeeding actions accordingly.

The contactor or movable circuit make and break member 30 is shown as in the form of a metallic member having three pockets or cavities 30ª having their axes parallel and extending in a plane which includes the casing axis, these pockets being adapted to receive brushes 31 yieldably supported in suitable manner as by springs 32. The inner portion of the contactor may be mounted on a rotatable support in suitable manner, a preferred way being to provide a ring-shaped portion 30ᵇ which is secured to a flange 33ª of a shaft 33, portion 30ᵇ being insulated from the flange in any preferred way. In Fig. 1 this mounting is shown as in the form of a plurality of screws arranged to accurately position the contactor on the shaft and rigidly connect it thereto so that the structure is readily taken apart and assembled when desired. Shaft 33 is rotatively mounted in face plate 21 and in the opposite wall of the casing axially of the composite contact structure, so that the movement of the contactor will provide approximately uniform conditions throughout its travel.

Shaft 33 extends through the casing wall and has its exposed end provided with a pinion 34 keyed or otherwise secured thereto external of the chamber in which the electrical elements are located. The movements of this pinion control the circuit make and break action of the apparatus, and these movements are provided by the mechanism now to be described.

35 designates an inclosing housing more or less cup-shaped and which is removably secured to the main casing 20; this housing, with the inner wall of casing 20 forms a second compartment in which pinion 34 and its operating mechanism is located. The housing has a central bearing 35ª through which extends a shaft-like portion 36ª of an annular member 36—preferably more or less spider-like in formation—which also carries a stud 36ᵇ which is seated and rotatable in a socket in the end of shaft 33, the mounting being such that shaft 33 and member 36 with its portions 36ª and 36ᵇ are rotatable on alined axes.

Member 36 carries an annular internal gear 37, which may be formed integral with member 36 but is preferably a separate member pinned or otherwise positively positioned relatively thereto, said gear 37 meshing with one or more gears 38 secured to the casing wall, said gears meshing with pinion 34. While but one gear may be utilized, I prefer to employ at least two of such gears, thus tending to decrease the effect of the thrust strains on the pinion by distributing these strains and producing a more balanced operation.

The outer exposed end shaft portion 36ª carries a lever 39 of suitable length, the free end of which has a link connection with an arm 40 carried as a part of the rudder structure. It will be understood, of course that the link is connected at equal distances from the axes of the rudder structure and the transmitter.

By the general arrangement of the operating mechanism described, it will be understood that the angular movements of lever 39 will be translated onto pinion 34 through the movements of gears 37 and 38, the parts having the effect of multiplying the length of movement through the gear ratio involved, the particular ratio shown being of the four-to-one type.

By the general construction shown, a number of advantages are obtained. For instance, by having all movements of the transmitter on a single axis, I am able to employ a more compact structure, since the operating mechanism is practically side by side with the circuit make and break mechanism; but one shaft structure is located within the contact compartment and that is central of the contact structure and least likely to affect the contact structure; the thrusts provided by the angular movements of lever 39 and the multiplying action of the gear ratio approach more closely a balanced condition, a positive advantage especially in cases where the rudder is rapidly shifted from one extreme to another; it permits the formation of two substantially independent compartments—one for the electrical structures, the other for the operating mechanism; it permits the use, if desired, of a constant lubricating action for the operating mechanism, through the ability to fill the non-electrical compartment with a lubricant such as grease; and it enables the structure to be formed in a manner to permit ready assemblage and take-down when necessary, whether it be of the electrical or operating side or both, each forming a general unit which can be handled separately without disturbing the other.

For purposes of disclosure, the lamps of the indicator are numbered numerically from 1 to 17, the various circuit connections of the transmitter being correspondingly numbered. The general arrangement of these circuits is shown in Fig. 5, wherein a source of electrical supply is shown at 41, one side of this supply leading to contact 23 and the other side to a terminal 42 common to the several lamp circuits, the latter being indicated at 43 as extending between contacts 24 and 25 and terminal 42 with a lamp 44 located in each circuit. As will be understood, circuits 43 are made active when contactor 30 bridges contact 23 and either or both contacts 24 and 25.

While I have herein shown and described a preferred embodiment of the invention, it will be readily understood that changes or modification therein may be found desirable or essential in meeting the various exigencies of use and I desire to be understood as reserving the right to make any and all such changes or modifications as may be found desirable or essential in so far as the same may fall within the spirit and scope of the invention as expressed in the accompanying claims, when broadly construed.

I claim—

1. In mechanism for automatically indicating positions of swinging or oscillating structures and wherein the indicator includes a plurality of normally-inactive indicating members each indicating a definite angular position of the structure, means for controlling the activity of the members, said means including a transmitting mechanism operative to translate the structure movements to the indicator through independent electrical circuit connections, said latter mechanism including a pair of stationary circuit make and break contacts each having segments individual to predetermined members, and a contactor movable relatively to said contacts, said contacts having a predetermined segment of one contact overlapping a segment zone of the other contact to produce a distinct indicating signal representing a definite angular distance in structure travel.

2. In mechanism for automatically indicating positions of swinging or oscillating structures and wherein the indicator includes a plurality of normally-inactive indicating members each indicating a definite angular position of the structure, means for controlling the activity of the members, said means including a transmitting mechanism operative to translate the structure movements to the indicator through independent electrical circuit connections, said latter mechanism including a pair of stationary circuit make and break contacts each having spaced-apart segments, the total segments corresponding in number to the number of indicating members and with a segment and member individually connected, and a contactor movable relatively to said contacts, said contacts being relatively positioned to normally render said members active individually, certain of said segments being relatively arranged to produce concurrent activity of adjacent members during travel of the contactor through a predetermined angular distance and predetermined angular distances.

3. In apparatus for indicating the position of a movable structure, transmitting mechanism including a rotatable contact member, contact elements in the path of the member and adapted to be successively engaged thereby, a casing in which said member is mounted, said casing provided with an inclosed chamber, means connected with the structure and actuated by movements thereof for rotating said member, said means including gearing rotatably mounted in said chamber coaxially with said member, said chamber being constructed to provide a lubricating compartment for the gearing.

4. In apparatus for indicating the position of a movable structure, transmitting mechanism including a rotatable contact member, contact elements in the path of the member and adapted to be successively engaged thereby, a casing in which said member is mounted, provided with an inclosed chamber, gearing mounted in said chamber, including a pinion coaxial with said contact member, said chamber being constructed to provide a lubricating compartment for the gearing, and means connecting the structure and gearing for actuating said gearing to rotate the contact member upon movements of the structure.

5. In mechanism for indicating positions of a pivoted element shiftable within predetermined limits and wherein the shifting movements control the activity of electrical circuits, transmitting mechanism including a contactor, a pivoted support therefor, stationary contacts in the path of travel of the contactor to produce therewith a circuit make and break device, a pivoted member forming a support for the element and having a portion supported by and axially alined with the axis of the contactor support, and means between said member and contactor support for providing concurrent movements therebetween, said means being operative to produce movements of the contactor support of an angular length multiplied in definite proportion relative to the angular length of member movement.

6. In mechanism for indicating positions of a pivoted element shiftable within predetermined limits and wherein the shifting movements control the activity of electrical circuits, transmitting mechanism including a contactor, a pivoted support therefor, stationary contacts in the path of travel of the contactor to produce therewith a circuit make and break device, a pivoted member forming a support for the element and having a portion supported by and axially alined with the axis of the contactor support and gear connections between said member and contactor support for providing concurrent movements therebetween, said gear connections being operative to produce movements of the contactor support of an angular length multiplied in definite proportion relative to the angular length of member movement.

7. In circuit make and break transmitting mechanism, the combination with a pivoted contactor and its support, and stationary contacts in the path of travel of the contactor, of means for moving said contactor, said means including a gear carried by and axially alined with the contactor support, a pivoted member having its axis alined with such gear axis, said member carrying a gear face, and a fixedly positioned gear operatively connecting said gear face and said support gear.

8. In circuit make and break transmitting mechanism, the combination with a pivoted contactor and its support, and stationary contacts in the path of travel of the contactor, of means for moving said contactor, said means including a gear carried by and axially alined with the contactor or support, a pivoted member having its axis alined with such gear axis, said member carrying a gear face, and a plurality of fixedly-positioned gears each operatively connecting said gear face with the supported gear.

9. In circuit make and break transmitting mechanism, the combination with a pivoted contactor and its support, and stationary contacts in the path of travel of the contactor, of means for moving said contactor, said means including a gear carried by and axially alined with the contactor support, a pivoted member having its axis alined with such gear axis, said member carrying an annular gear face, and a pair of fixedly positioned gears operatively connecting the gear face with the support gear, said pair of gears being of equal diameter and positioned on substantially diametrically opposite sides of the support gear.

10. In circuit make and brake transmitting mechanism, a pivoted contactor and its support, stationary contacts in the path of travel of the contactor, and means for moving the contactor pivotally, said support including an anular flange intermediate the ends of the support, said contactor including an annular portion surrounding and spaced from the support, and an insulating structure, said annular portion and insulating structure being removably secured to said flange.

11. In circuit make and break transmitting mechanism, a pivoted contactor and its support, stationary contacts in the path of travel of the contactor, a casing for the contactor and contacts with the contactor support mounted in the casing walls, said support carrying a gear external of a casing wall, a housing removably supported by the casing, a pivoted member within the housing and having a portion extending external of the housing, means for operatively connecting said member and gear to provide concurrent angular movements therebetween with the extent of movement dissimilar in definite proportions, and an actuating member external of the housing, said casing wall serving to isolate the housing and casing interiors.

12. In circuit make and break transmitting mechanism, a pivoted contactor and its support, stationary contacts in the path of travel of the contactor, a casing for the contactor and contacts with the contactor support mounted in the casing walls, said support carrying a gear external of a casing wall, a housing removably supported by the casing, a pivoted member within the housing, said member having its axis extending in alinement with the support axis, and having a portion extending external of the housing, means for operatively connecting said member and gear to provide concurrent angular movements therebetween with the extent of movement dissimilar in definite proportions, and an actuating member external of the housing, said casing wall serving to isolate the housing and casing interiors.

In testimony whereof I have hereunto set my hand.

FRANK W. WOOD.